(12) United States Patent
Nitzsche

(10) Patent No.: US 11,938,977 B2
(45) Date of Patent: Mar. 26, 2024

(54) SECURING ELEMENT AND LOSS-PREVENTION SYSTEM

(71) Applicant: SIEMENS MOBILITY GMBH, Munich (DE)

(72) Inventor: Christian Nitzsche, Ismaning (DE)

(73) Assignee: Siemens Mobility GmbH, Munich (DE)

( * ) Notice: Subject to any disclaimer, the term of this patent is extended or adjusted under 35 U.S.C. 154(b) by 1067 days.

(21) Appl. No.: 16/641,761

(22) PCT Filed: Jun. 11, 2018

(86) PCT No.: PCT/EP2018/065287
§ 371 (c)(1),
(2) Date: Feb. 25, 2020

(87) PCT Pub. No.: WO2019/037915
PCT Pub. Date: Feb. 28, 2019

(65) Prior Publication Data
US 2020/0391774 A1 Dec. 17, 2020

(30) Foreign Application Priority Data
Aug. 25, 2017 (DE) ...................... 10 2017 214 910.8

(51) Int. Cl.
*F16B 5/06* (2006.01)
*B61F 99/00* (2006.01)

(52) U.S. Cl.
CPC .............. *B61F 99/00* (2013.01); *F16B 5/06* (2013.01); *F16B 5/0635* (2013.01); *F16B 5/0642* (2013.01)

(58) Field of Classification Search
CPC .... F16B 5/02; F16B 5/025; F16B 5/06; F16B 5/0607; F16B 5/0621; F16B 5/0635;
(Continued)

(56) References Cited

U.S. PATENT DOCUMENTS 3,208,119 A * 9/1965 Alexander .............. F16B 5/121
52/712
3,730,466 A 5/1973 Swanquist
(Continued)

FOREIGN PATENT DOCUMENTS

CN 2786337 Y 6/2006
CN 102947656 A 2/2013
(Continued)

*Primary Examiner* — Josh Skroupa
*Assistant Examiner* — Kevin J Baynes
(74) *Attorney, Agent, or Firm* — Laurence A. Greenberg; Werner H. Stemer; Ralph E. Locher

(57) ABSTRACT

A loss-prevention system includes a securing element securing components of a vehicle or rail vehicle and having a first portion and first and second lugs. The first portion is an elongate plate extending in a first plane. A first through-passage opening is disposed in the first portion. The first through-passage opening accommodates at least part of a first releasable connection for fastening the securing element on a first component. The first portion has a long side. The first and second lugs are disposed on the long side of the first portion, or opposite one another, and project from the first plane onto a common side of the first portion. The first lug is configured to rest on the upper side of the first component. The second lug is configured to support a second component on its underside and to secure the same against falling off.

15 Claims, 6 Drawing Sheets

(58) Field of Classification Search
CPC .. F16B 5/0642; F16B 2200/506; E05B 83/04; E05B 83/06; E05B 83/363; Y10T 403/58; Y10T 403/581; Y10T 403/583; Y10T 403/585; Y10T 403/587; Y10T 403/7062; B61F 99/00
USPC .......................... 403/315, 316, 317, 318, 319
See application file for complete search history.

(56) References Cited

U.S. PATENT DOCUMENTS

| | | | |
|---|---|---|---|
| 3,738,406 A | 6/1973 | Williams | |
| 3,746,378 A * | 7/1973 | Meyer | F16B 5/04 52/511 |
| 5,211,521 A * | 5/1993 | Page | F16B 5/0642 411/182 |
| 5,481,844 A * | 1/1996 | Kajita | E04B 1/26 52/745.12 |
| 6,389,658 B1 | 5/2002 | Pfaller et al. | |
| 6,662,517 B1 * | 12/2003 | Thompson | E04B 7/045 52/715 |
| 7,360,745 B2 * | 4/2008 | Nikayin | H02G 3/126 248/216.1 |
| 7,559,519 B1 * | 7/2009 | Dragic | E04B 2/7457 52/712 |
| 8,800,120 B2 * | 8/2014 | Benedetti | F16B 5/0642 24/282 |
| 9,810,251 B2 * | 11/2017 | Lewis | B64D 11/00 |
| 10,251,296 B2 * | 4/2019 | Nakamura | H05K 1/18 |
| 2010/0008746 A1 | 1/2010 | Degelis et al. | |
| 2017/0114812 A1 | 4/2017 | Jeker et al. | |

FOREIGN PATENT DOCUMENTS

| | | | | |
|---|---|---|---|---|
| CN | 105257638 A | | 1/2016 | |
| EP | 1050940 A1 | | 11/2000 | |
| EP | 1650365 A1 | * | 4/2006 | ............... E03C 1/33 |
| FR | 2913469 A1 | | 9/2008 | |
| GB | 2509622 A | * | 7/2014 | ............... F16B 2/241 |
| RU | 2599612 C1 | | 4/2015 | |
| SU | 452969 A3 | | 12/1974 | |
| SU | 550492 A1 | | 3/1977 | |
| SU | 1642121 A1 | | 4/1991 | |
| WO | WO-9921729 A1 | * | 5/1999 | ......... B60R 13/0206 |

* cited by examiner

SECURING ELEMENT AND LOSS-PREVENTION SYSTEM

BACKGROUND OF THE INVENTION

Field of the Invention

The present invention relates to a securing element for securing components of a vehicle, in particular of a rail vehicle, as claimed in claim 1, and to a loss-prevention system, in particular a rail vehicle, as claimed in claim 12.

The present invention relates to a securing element for securing components of a vehicle, in particular of a rail vehicle, and to a loss-prevention system, in particular a rail vehicle, having a securing element.

In the rail sector, it may be stipulated that screw connections of components mounted in the underfloor area of a rail vehicle must not be loaded in tension, or that the rail vehicle has to be equipped with a securing element when a screw connection is loaded in tension in the underfloor area. Such a stipulation needs to be observed for example in the USA.

The prior art discloses a securing element having horizontally arranged bolts, secured on both sides, between a carriage body structure and a component to be mounted.

SUMMARY OF THE INVENTION

It is an object of the present invention to specify an improved securing element for securing components of a vehicle, in particular of a rail vehicle, and a loss-prevention system having at least one securing element and one secured component.

These objects are achieved by a securing element having the features described below and by a loss-prevention system having the features described below. Various embodiments are specified in the dependent claims.

These objects are achieved by a securing element having the features of independent claim 1 and by a loss-prevention system having the features of independent claim 12. Various embodiments are specified in the dependent claims.

A securing element for securing components of a vehicle, in particular of a rail vehicle, has a first portion, a first lug and a second lug. The first portion is configured in the form of an elongate plate and extends in a first plane. At least one first through-opening is arranged in the first portion. The first through-opening is configured to at least partially receive a first releasable connection for fastening the securing element to a first component. The first portion has a long side. The first lug and the second lug are arranged opposite one another on the long side of the first portion and project from the first plane onto a common side of the first portion. The first lug is configured to rest on the top side of the first component. The second lug is configured to support a second component on its underside and to secure it against falling off.

This configuration has the advantage that simple and reliable loss prevention can be provided, which, in particular when the second component is fastened to the first component by means of a screw connection loaded in tension, upon failure of the screw connection, prevents the second component, which is arranged on the underside of the first component, from falling off in that the first lug rests on the top side of the first component, while the second component rests on the top side of the second lug. The securing element is furthermore particularly easy and cost-effective to produce and easy for only one person to fit.

In one embodiment, the first lug has a first cutout. The first cutout is configured to at least partially receive the first component. The first lug is connected by a first fixed end to the long side of the first portion. The first cutout is arranged on a side of the first lug facing the second lug and is open toward the second lug. The first cutout is arranged in a manner adjoining the fixed end and is preferably configured in the form of a slot. This configuration has the advantage that, in the fitted state, the first component can engage in the first cutout, with the result that slipping of the securing element in at least one spatial direction can be prevented. The securing element can be displaced along the first component in a second spatial direction. As a result, easy positioning of the second component relative to the first component and of the securing element relative to the first component is possible.

In one embodiment, the second lug has a second cutout. The second cutout is configured to at least partially receive the second component. The second lug is connected by a second fixed end to the long side of the first portion. The second cutout is arranged in a manner adjoining the second fixed end. The second cutout is preferably configured in the form of a slot. The second cutout is arranged on a side of the second lug facing the first lug and is open toward the first lug. In the fitted state of the loss-prevention system, the second component can at least partially engage in the second cutout, with the result that slipping of the second component can be prevented. As a result, the second component bears securely on the second lug.

In one embodiment, the first lug has a first lug region and a first arc region. The second lug has a second lug region and a second arc region. The first and the second lug region are configured in a planar manner. The first lug region extends in a second plane. The second lug region extends in a third plane. The second and the third plane are each arranged in a first direction parallel to the first portion and in a second direction at an angle, preferably perpendicularly, to the first portion. The first lug region adjoins a first free end. The second lug region adjoins a second free end. The first arc region connects the first lug region to the first portion. The second arc region connects the second lug region to the first portion. As a result, the first lug can rest on the first component with its first lug region, which extends in the second plane. The second component can as a result rest on the second lug region of the second lug, which extends in the third plane.

In one embodiment, the second plane and the third plane overlap or the second plane is configured in a manner parallel to the third plane. As a result, the tool for producing the securing element can be configured in a particularly simple manner.

In one embodiment, the securing element has a second portion and a third portion. The second portion and the third portion are each configured in the form of an elongate plate. The second portion and the third portion extend in the first plane. The third portion and the first portion are arranged in an offset manner with respect to one another. The second portion is arranged at an angle, preferably perpendicularly, to the first portion and/or to the third portion. The second portion is arranged between the first portion and the third portion and connects the first portion to the third portion. The third portion is arranged parallel to the first portion. The securing element also has a third lug and a fourth lug. The third portion has a long side. The third lug and the fourth lug are arranged opposite one another on the long side of the third portion and project from the first plane onto a common side of the third portion and onto the same side as the first and second lugs. The third lug is configured to rest on the top side of the first component. The fourth lug is configured to support the second component on its underside and to secure it against falling off. As a result, the securing element can absorb particularly high supporting forces.

In one embodiment, the third portion has at least one second through-opening. The second through-opening is configured to at least partially receive a second releasable connection for fastening the securing element to the first component. As a result, the securing element can be connected to the first component in a rotationally secured manner by a second releasable connection.

In one embodiment, the third lug has a third cutout and/or the fourth lug has a fourth cutout. The third lug is connected by a third fixed end and the fourth lug is connected by a fourth fixed end to the long side of the third portion. The third cutout is configured to at least partially receive the first component and/or the fourth cutout is configured to at least partially receive the second component. The third cutout is arranged in a manner adjoining the third fixed end of the third lug and/or the fourth cutout is arranged in a manner adjoining the fourth fixed end of the fourth lug. The third cutout is arranged on a side of the third lug facing the fourth lug and is open toward the fourth lug and/or the fourth cutout is arranged on a side of the fourth lug facing the third lug and is open toward the third lug. As a result, the second component is particularly reliably secured against falling off.

In one embodiment, the third lug extends partially in a fourth plane and the fourth lug extends partially in a fifth plane. The second plane and the fourth plane and/or the third plane and the fifth plane are arranged parallel to one another.

In one embodiment, the third lug and/or the fourth lug is/are arranged on a side of the third portion facing the first portion and the first lug and/or the second lug is/are arranged on a side of the first portion facing the third portion.

In one embodiment, the third lug and/or the fourth lug is/are arranged on a side of the third portion facing away from the first portion and the first lug and/or the second lug is/are arranged on a side of the first portion facing away from the third portion.

A loss prevention system, preferably a rail vehicle, has at least one securing element, a first component and a second component, and at least a first releasable connection and a third releasable connection. The first releasable connection engages through the first through-opening and fastens the securing element to the first component. The third releasable connection, loaded in tension, connects the first component to the second component. The first component and the second component are arranged at least partially between the first lug and the second lug. The second component, upon failure and/or releasing of the third releasable connection, rests on the second lug and the second lug secures the second component against falling down. The first lug, upon failure and/or releasing of the first releasable connection, rests on the first component and retains the securing element on the first component.

In one embodiment, the first component has a first engagement portion. The first engagement portion is oriented parallel to the first portion. The first engagement portion engages in the first cutout. Upon failure and/or releasing of the third releasable connection, a first stop face of the first engagement portion, which is arranged at a free end of the first engagement portion, rests on a bottom of the first cutout. As a result, the first lug rests securely on the first component when the first engagement portion of the first component engages in the first cutout.

In one embodiment, the second component has a second engagement portion. The second engagement portion is oriented parallel to the first portion and extends in an opposite direction to the first engagement portion. The second engagement portion engages in the second cutout. Upon failure and/or releasing of the third releasable connection, a second stop face of the second engagement portion, which is arranged at a free end of the second engagement portion, rests on a bottom of the second cutout. As a result, any slipping of the securing element off the components in the partially fitted state is reliably avoided.

The above-described properties, features and advantages of this invention and the manner in which these are achieved will become clearer and more easily understandable in conjunction with the following description of the exemplary embodiments, which are explained in more detail in conjunction with the drawings.

DETAILED DESCRIPTION OF THE INVENTION

In all the figures, reference is made to a coordinate system having an x-axis, a y-axis and a z-axis. The coordinate system is in the form of a right-handed trihedron.

Figure 1:
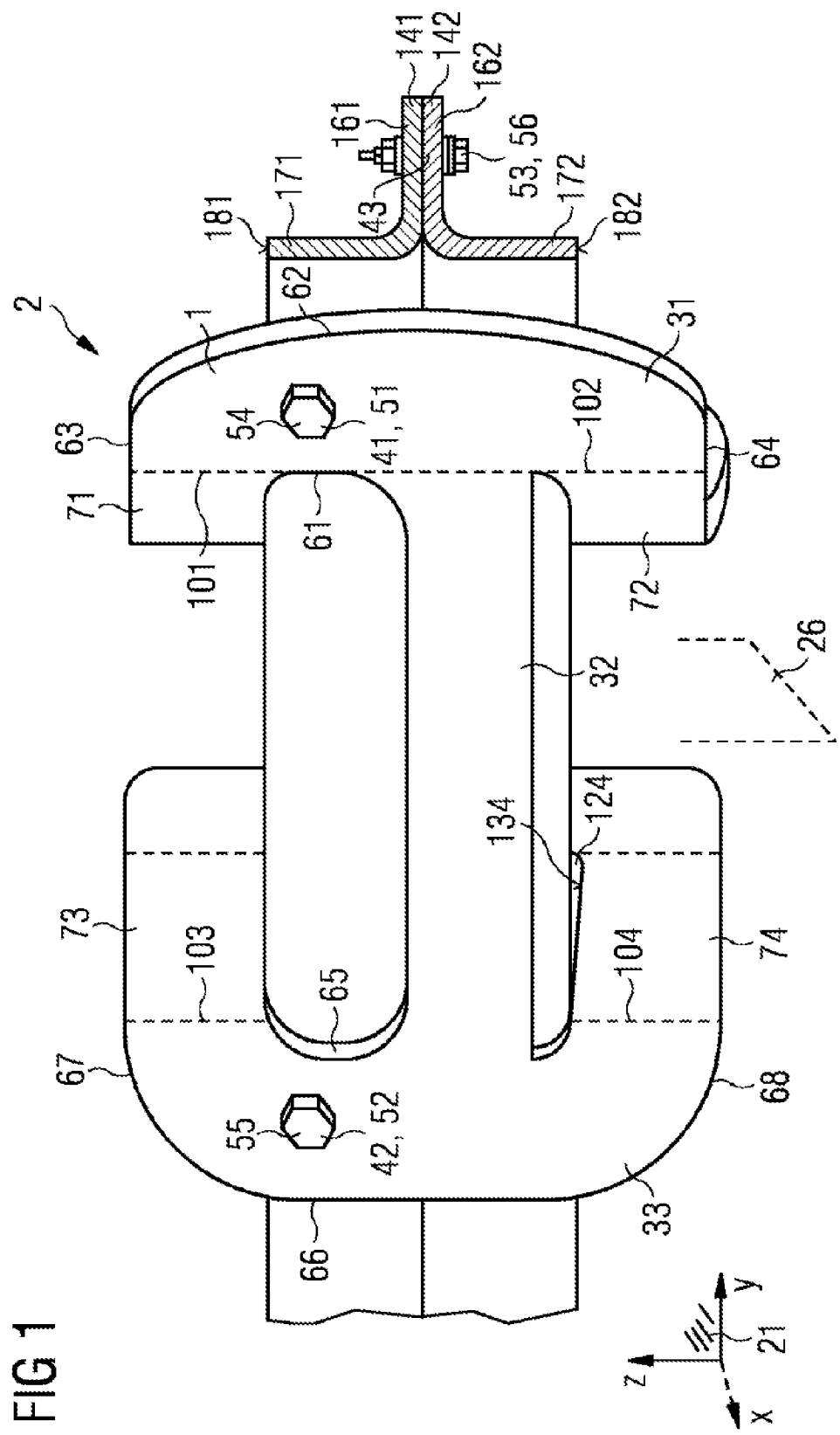
FIG. 1 shows a perspective view of a loss-prevention system having a securing element according to a first embodiment.

FIG. 1 shows a three-dimensional view of a detail of a rail vehicle, configured as a loss-prevention system 2, having a securing element 1, a first component 141 and a second component 142.

The first component 141 can be for example a sandbox. Sandboxes are typically fitted in the underfloor area in rail vehicles, wherein the sand is used in order to increase friction during emergency braking of the rail vehicle. The second component 142 can be for example a sandbox cover. The second component 142 is arranged on the underside of the first component 141. Of course, the first component 141 and/or the second component 142 can be some other component of the rail vehicle 2 that is arranged in the underfloor area.

In FIG. 1, the first component 141 and the second component 142 are only partially illustrated for reasons of clarity. Also, only one securing element 1 is illustrated. It is also possible for a plurality of securing elements 1 to be used to secure the second component 142 against falling off. The number of securing elements 1 necessary for securing the second component 142 can depend for example on the size and the mass of the second component 142 to be secured.

The first component 141 has a first holding portion 161 and a first engagement portion 171. The first engagement portion 171 is connected to the first holding portion 161. The first engagement portion 171 and the first holding portion 161 are configured in a plate-like manner.

The second component 142 has a second holding portion 162 and a second engagement portion 172 connected to the second holding portion 162. The second engagement portion 172 and the second holding portion 162 are configured in a plate-like manner. The holding portions 161, 162 are formed at an angle, preferably perpendicularly, to the engagement portions 171, 172.

The first engagement portion 171 and the second engagement portion 172 are each oriented for example parallel to the z-axis. The second engagement portion 172 extends in an opposite direction to the first engagement portion 171. The second engagement portion 172 of the second component 142 can also be omitted, however. In this case, the second component 142 has only the second holding portion 162.

The first and the second engagement portion 171, 172 each have a first and a second stop face 181, 182. The stop faces 181, 182 are each arranged at a free end of the engagement portions 171, 172 and are oriented parallel to the holding portions 161, 162.

The securing element 1 has a first portion 31, a second portion 32 and a third portion 33. The first portion 31 is configured in the form of an elongate plate and extends in a first plane 21. A first long side 61 and a second long side 62 of the first portion 31 extend for example parallel to the z-axis. A first short side 63 and a second short side 64 are arranged opposite one another in the y direction and connect the two long sides 61, 62 of the first portion 31 together.

Arranged in the first portion 31 is a first through-opening 41. The first through-opening 41 can be in the form of a bore. The first portion 31 can also have a plurality of first through-openings 41.

The second portion 32 and the third portion 33 are each configured in the form of an elongate plate. The second portion 32 and the third portion 33 extend in the first plane 21. The third portion 33 and the first portion 31 are arranged in an offset manner with respect to one another in the y direction. In the example illustrated in FIG. 1, the first portion 31 and the third portion 33 are oriented for example parallel to one another. The second portion 32 is arranged at an angle, preferably perpendicularly, to the first portion 31 and/or to the third portion 33. The second portion 32 is arranged between the first portion 31 and the third portion 33 and connects the first portion 31 to the third portion 33. In the z direction, the second portion 32 is configured in a narrower manner than the first portion 31 and the third portion 33.

The third portion 33 has at least one second through-opening 42. The second through-opening 42 is in the form of a bore and extends in the x direction through the third portion 33. The first through-opening 41 and the second through-opening 42 are configured for example in an identical manner, and are arranged at the same height in the z direction and extend in a parallel manner. The third portion 33 can also have a plurality of second through-openings 42.

Furthermore, a third through-opening and a fourth through-opening are arranged in the first engagement portion 171. In FIG. 1, the third and the fourth through-opening are concealed by the securing element 1. The third through-opening is aligned with the first through-opening 41 and the second through-opening 42 is aligned with the fourth through-opening.

The loss-prevention system 2 also has a first releasable connection 51 and preferably a second releasable connection 52. The first and/or second releasable connection 51, 52 is in the form of a screw connection. A first screw 54 of the first releasable connection 51 engages through the first through-opening 41 and third through-opening. A second screw 55 engages through the second through-opening 42 and the fourth through-opening. The releasable connection 51, 52 fastens the securing element 1 releasably to the first engagement portion 171. Some other configuration of the releasable connection 51, 52 is also conceivable.

The securing element 1 also has a first lug 71, a second lug 72, a third lug 73 and a fourth lug 74. In this case, the first lug 71 is connected by a first fixed end 101 and the second lug 72 is connected by a second fixed end 102 to the first long side 61 of the first portion 31 in a manner opposite one another in the z direction. The second long side 62 of the first portion 31 is free. The first lug 71 is arranged for example in a manner adjoining the first short side 63 of the first portion 31. The second lug 72 is arranged in a manner adjoining the second short side 64 of the first portion 31. The second portion 32 is arranged in a manner spaced apart from the first and second lugs 71, 72 for example in a central position between the first lug 71 and the second lug 72.

The third portion 33 is configured for example in a mirror symmetric manner to the first portion 31 with respect to a first plane of symmetry 26. A first long side 65 and a second long side 66 of the third portion 33 extend for example parallel to the z-axis. A first short side 67 and a second short side 68 of the third portion 33 are arranged opposite one another in the z direction and connect the two long sides 65, 66 of the third portion 33 together. The first short side 67 of the third portion 33 is arranged for example at the same height in the z direction as the first short side 63 of the first portion 31. The second short side 68 of the third portion 33 is arranged for example at the same height in the z direction as the second short side 64 of the first portion 31. The first long side 61 of the first portion 31 and the first long side 65 of the third portion 65 are arranged on sides of the first portion 31 and third portion 33 that face one another. The second long side 62 of the first portion 31 and the second long side 65 of the third portion 65 are arranged on sides of the first and third portion 31, 33 that face away from one another.

The third lug 73 is connected by a third fixed end 103 and the fourth lug 74 is connected by a fourth fixed end 104 to the first long side 65 of the third portion 33 in a manner opposite one another in the z direction. The second long side 66 of the third portion 33 is free. The third lug 73 is arranged in a manner adjoining the first short side 67 of the third portion 33. The fourth lug 74 is arranged in a manner adjoining the second short side 68 of the third portion 33.

All of the lugs 71, 72, 73, 74 project out of the first plane 21 on a common side, facing the components 141, 142, of the first and the third portion 31, 33.

The securing element 1 exhibits a metal, for example iron or steel. The securing element 1 can be formed for example from a metal sheet by means of a stamping and bending process. The securing element 1 can also be produced by welding individual components and/or by means of a machining process, however.

Figure 2:
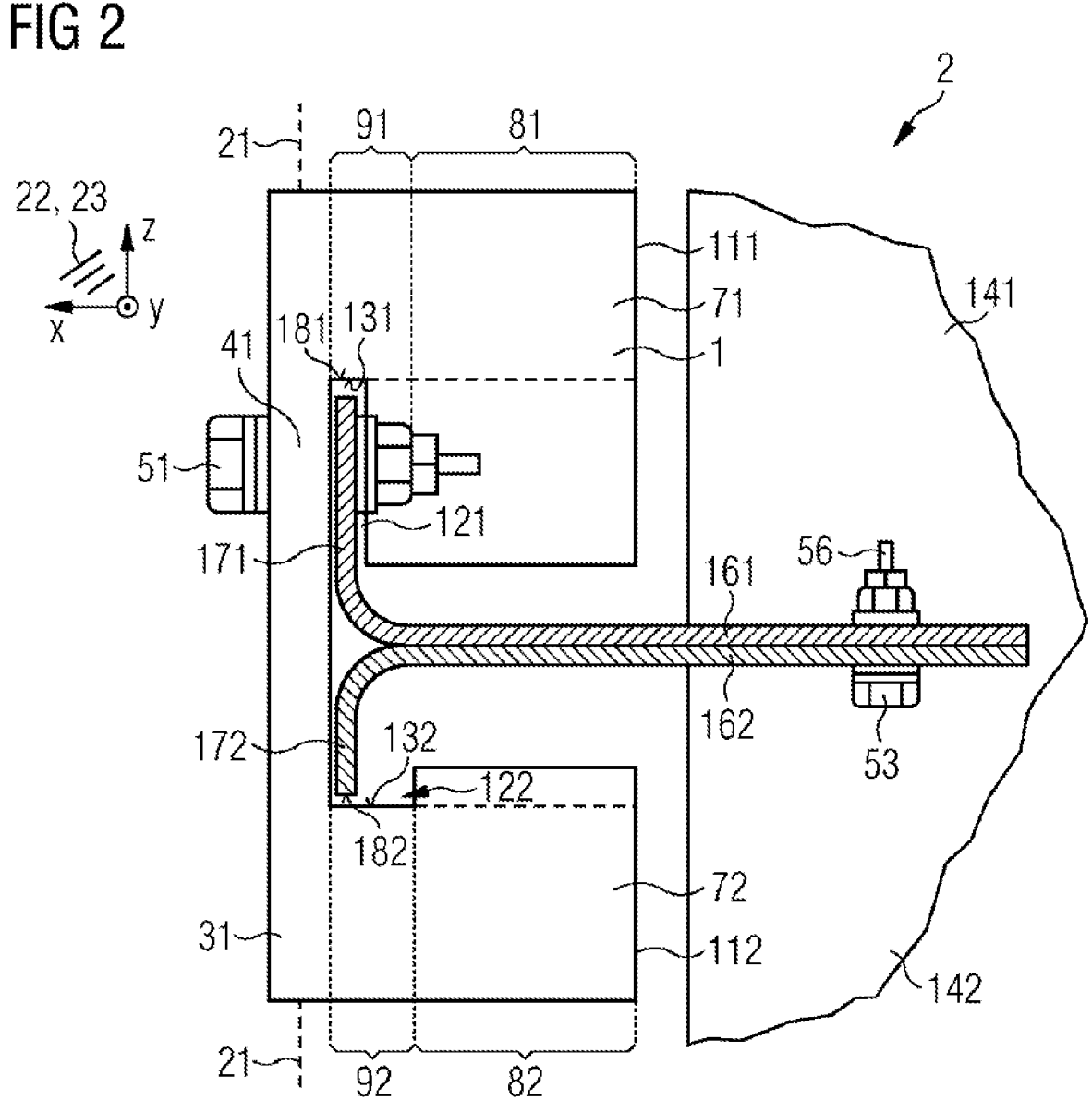
FIG. 2 shows a first side view of the loss-prevention system shown in FIG. 1.

FIG. 2 shows a first side view of the loss-prevention system shown in FIG. 1. In this case, only the first and the second lugs 71, 72 can be seen in the side view, since they conceal the third and the fourth lug 73, 74.

The first lug 71 has a first cutout 121. The first cutout 121 is configured in the form of a slot and has a first cutout bottom 131. The first cutout bottom 131 is configured in a manner corresponding to the first stop face 181 and is formed for example in a planar manner in the embodiment. The first cutout bottom 131 is arranged at a distance from the first stop face 181. The first cutout 121 is arranged on a side of the first lug 71 facing the second lug 72 and is open towards the second lug 72. In the illustration in FIG. 2, the first cutout 121 has a rectangular cross section and adjoins the first portion 31. The first engagement portion 171 of the first component 141 engages partially in the first cutout 121. The first cutout 121 can also be omitted, however.

The second lug 72 has a second cutout 122. The second cutout 122 is configured in the form of a slot and has a second cutout bottom 132. The second cutout bottom 132 is configured in a manner corresponding to the second stop face 182 and is formed for example in a planar manner in the embodiment. The second cutout bottom 132 is arranged at a distance from the second stop face 182. The second cutout 122 is arranged on a side of the second lug 72 facing the first lug 71 and is open toward the first lug 71. In the illustration in FIG. 2, the second cutout 122 has a rectangular cross section and adjoins the first portion 31. The second engagement portion 172 of the second mount 152 of the second component 142 engages in the second cutout 122.

In FIG. 2, the first cutout 121 is configured for example in a longer manner in the z direction than the second cutout 122, while, for example, the second cutout 122 is configured in a wider manner along the x-axis than the first cutout 121. It is also possible for the cutouts 121, 122 to be configured in some other way.

The first lug 71 has a first lug region 81 and a first arc region 91. The second lug 72 has a second lug region 82 and a second arc region 92. The first lug region 81 adjoins a first free end 111 of the first lug 71 and the second lug region 82 adjoins a second free end 112 of the second lug 72. The arc region 92, 94 is in the form for example of a quarter-circle arc. The first arc region 91 connects the first lug region 81 to the first portion 31. The second arc region 92 connects the second lug region 82 to the first portion 31. The first arc region 91 and the second arc region 94 can also be omitted, however. In this case, the first lug region 81 and the second lug region 82 are directly connected to the first portion 31.

The first lug region 81 is configured in a planar manner and extends in a second plane 22. The second lug region 82 is configured in a planar manner and extends in a third plane 23. The second and the third plane 22, 23 are each oriented in a first direction 11 parallel to the first portion 31 and are arranged at an angle, preferably perpendicularly, to the first portion 31 in a second direction 12. The first direction 11 is oriented parallel to the z-axis. The second direction 12 is oriented parallel to the x-axis when the second and the third plane 22, 23 are oriented perpendicularly to the first portion 31, this being the case in FIG. 2. However, it is important, in order to ensure high rigidity of the securing element 1, that the lug regions 81, 82, as described above, are oriented in a standing manner with respect to the first portion 31, i.e. an extension of the lug region 81, 82 in the z direction is greater than a thickness of the lug region 81, 82 in the y direction.

The first and the second holding portion 161, 162 are pressed together and held together by means of a third releasable connection 53. The third releasable connection 53 can be for example a screw connection, loaded in tension, with a third screw 56.

Figure 3:
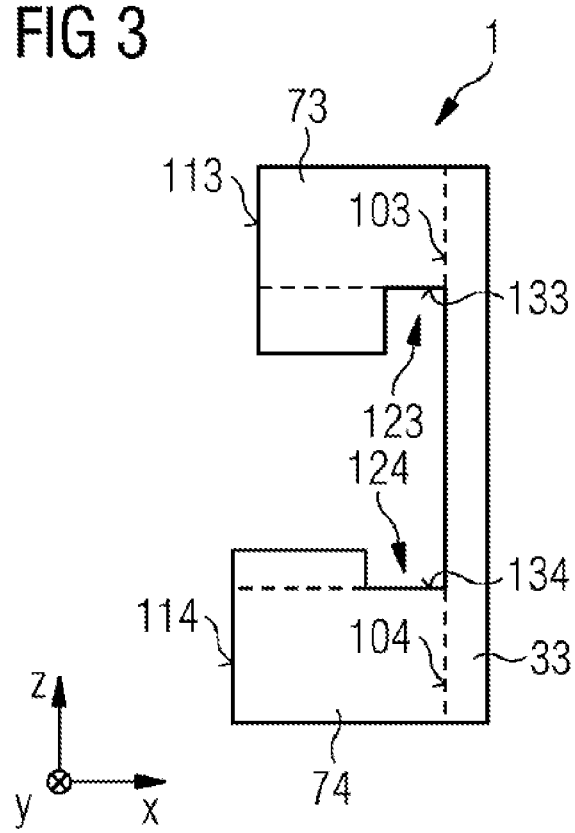
FIG. 3 shows a second side view of the securing element of the loss-prevention system shown in FIGS. 1 and 2.

FIG. 3 shows a second side view of the securing element 1, shown in FIGS. 1 and 2, of the loss-prevention system 2.

The third lug 73 has a third cutout 123. The third cutout 123 is configured in the form of a slot and has a third cutout bottom 133. The third cutout bottom 133 is configured in a manner corresponding to the first stop face 181 and is formed for example in a planar manner in the embodiment. The third cutout bottom 133 is arranged at a distance from the first stop face 181. The third cutout 123 is arranged on a side of the third lug 73 facing the fourth lug 74 and is open toward the fourth lug 74. In the illustration in FIG. 3, the third cutout 123 has a rectangular cross section and adjoins the third portion 33. The first engagement portion 171 of the first component 141 engages partially in the third cutout 123. The third cutout 123 can also be omitted, however. In this case, the third lug 73 is configured only to rest on the first component 141 rather than receiving it at least partially in the third cutout 123.

The fourth lug 74 has a fourth cutout 124. The fourth cutout 124 is configured in the form of a slot and has a fourth cutout bottom 134. The fourth cutout bottom 134 is configured in a manner corresponding to the second stop face 182 and is formed for example in a planar manner in the embodiment. The fourth cutout bottom 134 is arranged at a distance from the second stop face 182. The fourth cutout 124 is arranged on a side of the fourth lug 74 facing the third lug 73 and is open toward the third lug 73. In the illustration in FIG. 3, the fourth cutout 124 has a rectangular cross section and is located in the third portion 31. The second engagement portion 172 of the second mount 152 of the second component 142 engages in the fourth cutout 124.

In FIG. 3, the third cutout 123 is configured for example in a longer manner in the z direction than the fourth cutout 124, while, for example, the fourth cutout 124 is configured in a wider manner along the x-axis than the third cutout 123. Furthermore, in the z direction, the third cutout 123 and the first cutout are configured with an identical depth, wherein the first cutout bottom and the third cutout bottom 133 are arranged in a common xy-plane. Furthermore, in the z direction, the second cutout and the fourth cutout 124 are configured with an identical depth, wherein the second cutout bottom and the fourth cutout bottom 134 are arranged in a common further xy-plane. It is also possible for the cutouts 123, 124 to be configured in some other way.

Figure 4:
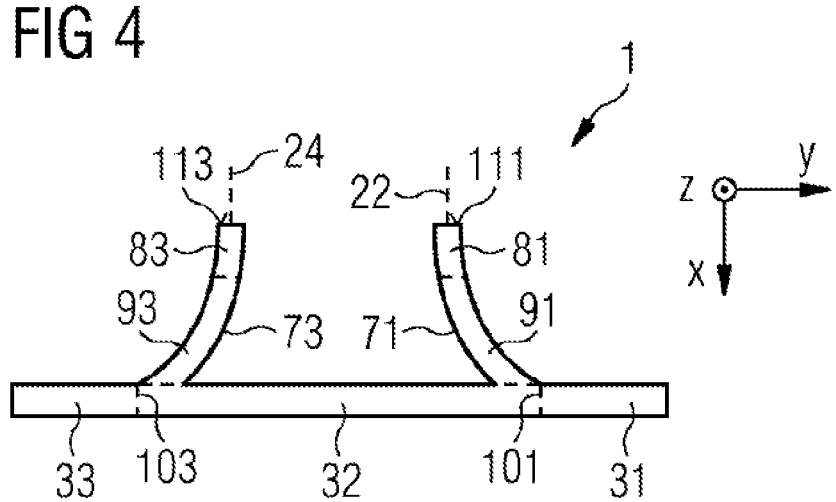
FIG. 4 shows a plan view of the securing element shown in FIGS. 1 to 3.

FIG. 4 shows a plan view of the securing element 1 shown in FIGS. 1 to 4 along the z-axis.

The third lug 73 has a third lug region 83 and a third arc region 93. The third lug region 83 adjoins a third free end 113 of the third lug 73. The first and the third arc region 91, 93 are configured for example as quarter circle arcs. The third arc region 93 connects the third lug region 83 to the third portion 33. The third arc region 93 can also be omitted, however. In this case, the third lug region 83 is connected directly to the third portion 33.

The third lug region 83 is configured in a planar manner and extends in a fourth plane 24. The fourth plane 24 is oriented parallel to the third portion 33 in a first direction 11 and is arranged at an angle, preferably perpendicularly, to the first portion 31 in a second direction 12. The first direction 11 is oriented parallel to the z-axis. The second direction 12 is oriented parallel to the x-axis when the fourth plane 24 is oriented perpendicularly to the third portion 33. However, it is important, in order to ensure high rigidity of the securing element 1, that the lug region 83, as described above, is oriented in a standing manner with respect to the third portion 33, i.e. an extension of the lug region 83 in the z direction is greater than a thickness of the lug region 83 in the y direction.

The second plane 22 and the third plane overlap one another in the embodiment of the securing element 1, which is why the second lug region cannot be seen in FIG. 4, since it is concealed by the first lug region 81. The second and the third plane 22 can also be configured in a manner parallel and offset to one another or at an angle to one another, however, such that the second plane 22 and the third plane intersect one another.

The fourth plane 24 and the fifth plane overlap in the embodiment, which is why the fourth lug region cannot be seen in FIG. 4, since it is concealed by the third lug region 83. The fourth and the fifth plane 24 can also be configured in a manner parallel and offset to one another or at an angle to one another, however, such that the fourth plane 24 and the fifth plane intersect one another.

Upon failure and/or releasing (intentional or unintentional) of the third releasable connection 53, the second component 142 drops down until the second stop face 182 of the second engagement portion 172 rests on the second cutout bottom 132 of the second cutout 122 and on the fourth cutout bottom 134 of the fourth cutout 124.

In a development of the embodiment shown in FIGS. 1 to 6, the first cutout 121 and the third cutout 123 can also be omitted, however. In this case, the second component 142 rests on the second lug 72 and the fourth lug 74.

In a weight-optimized design of the loss-prevention system 2, upon failure of the third releasable connection 53, the screws 54, 55 of the first and second releasable connection 51, 52 are sheared off, such that the first stop face 181 of the first engagement portion 171 rests on the first cutout bottom 131 and the third cutout bottom 133.

In a development of the embodiment shown in FIGS. 1 to 6, the first cutout 121 and the third cutout 123 can also be omitted, however. In this case, the first lug 71 and the third lug 73 rest on the first component 141.

The securing element 1 is fitted in that the securing element 1 is pushed laterally onto the first engagement portion 171 and, if present, onto the second engagement portion 172, such that the first component 141 and the third second component 142 are arranged at least partially between the first and the third lug 71, 73 and the second and the fourth lug 72, 74. It is also possible for the cutouts 121, 122, 123, 124 to be configured such that the securing element can be applied to the engagement portions 171, 172 by way of a tilt and turn movement (about the y-axis). As a result, the second component 142 is already provisionally fixed. A fitter can subsequently attach the releasable connections 51, 52, 53 and fasten the second component 142 to the first component 141 alone (without being helped by a further fitter).

Figure 5:
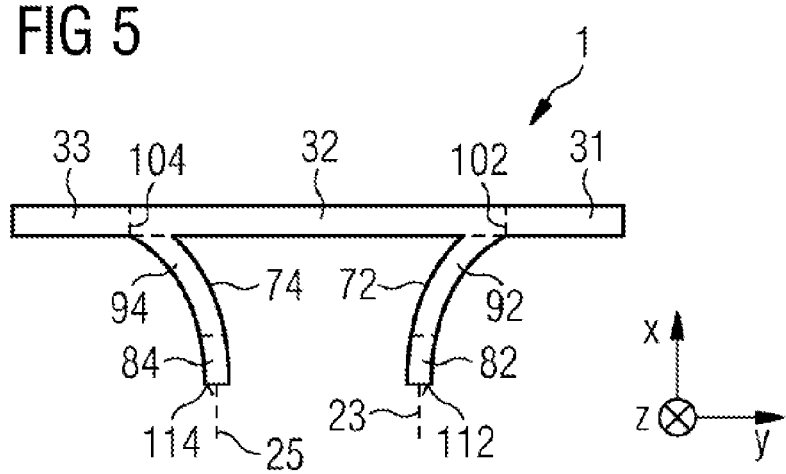
FIG. 5 shows a bottom view of the securing element shown in FIGS. 1 to 4.

FIG. 5 shows a bottom view of the securing element 1 shown in FIGS. 1 to 3 along the z-axis.

The fourth lug 74 has a fourth lug region 84 and a fourth arc region 94. The fourth lug region 84 adjoins a fourth free end 114 of the fourth lug 74. The second and the fourth arc region 92, 94 are configured for example as quarter circle arcs. The fourth arc region 94 connects the fourth lug region 84 to the third portion 33. The fourth arc region 94 can also be omitted, however. In this case, the fourth lug region 84 is directly connected to the third portion 33.

The second lug region 82 is configured in a planar manner and extends in a third plane 23. The fourth lug region 84 is configured in a planar manner and extends in a fifth plane 25.

The third and the fifth plane 23, 25 are each oriented parallel to the first portion 31 in a first direction 11 and are arranged at an angle, preferably perpendicularly, to the first portion 31 in a second direction 12. The first direction 11 is oriented parallel to the z-axis. The second direction 12 is oriented parallel to the x-axis when the third and the fifth plane 23, 25 are oriented perpendicularly to the first portion 31. However, it is important, in order to ensure high rigidity of the securing element 1, that the lug regions 82, 84, as described above, are oriented in a standing manner with respect to the first and third portion 31, 33, i.e. an extension of the lug region 82, 84 in the z direction is greater than a thickness of the lug region 82, 84 in the y direction.

Figure 6:
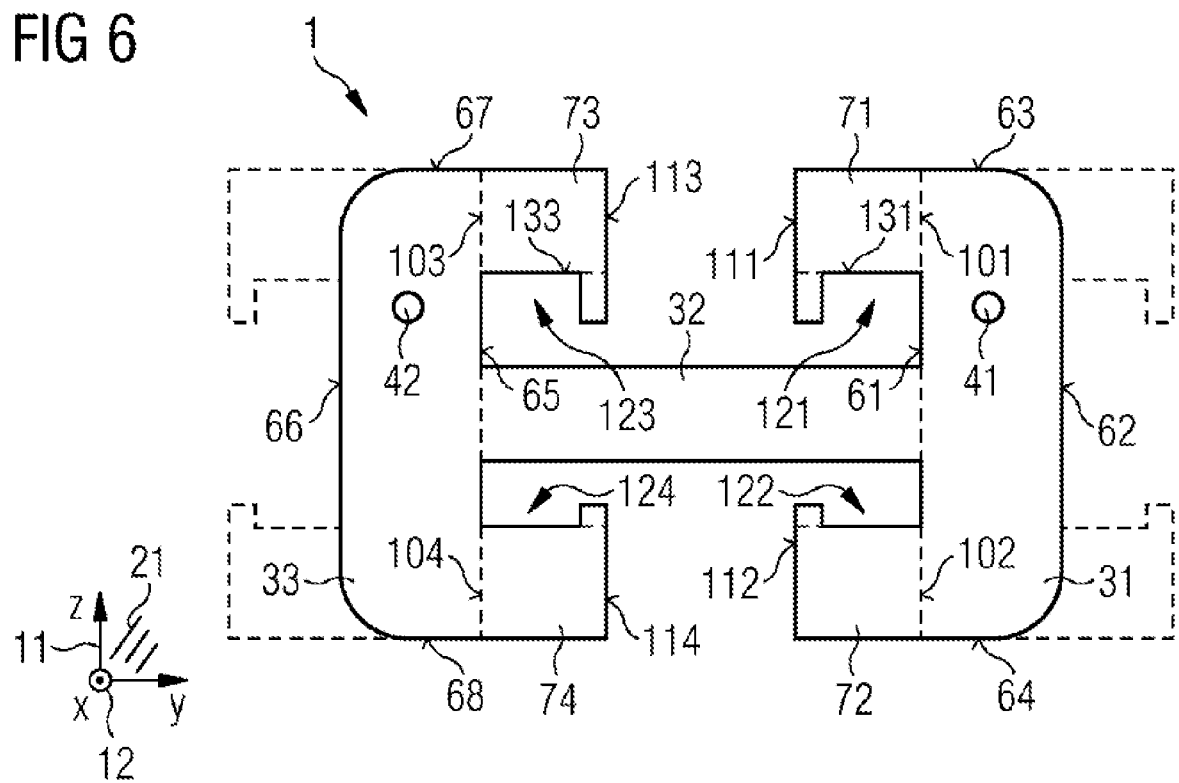
FIG. 6 shows a front view of the securing element shown in FIGS. 1 to 5.

FIG. 6 shows a front view of the securing element 1 shown in FIGS. 1 to 5 along the x-axis.

In the y direction, the cutouts 121, 122, 123, 124 are configured with an identical width. Of course, a different configuration of the cutouts 121, 122, 123, 124 is also conceivable.

A development of the embodiment shown in FIGS. 1 to 5 is indicated by means of dashed lines. The first lug 71 and the second lug 72 do not have to be arranged jointly on the first long side 61 of the first portion 31. The first lug 71 can also be arranged on the first long side 61 and the second lug 72 on the second long side 62 of the first portion 31. An arrangement the other way round is also possible, such that the first lug 71 is arranged on the second long side 62 and the second lug 72 on the first long side 61 of the first portion 31. It is also possible for the first lug 71 and the second lug 72 to be arranged jointly on the second long side 62 (on a side facing away from the second portion 32) of the first portion 31.

The third lug 73 and the fourth lug 74 do not have to be arranged jointly on the first long side 65 of the third portion 33. The third lug 73 can also be arranged on the first long side 65 and the fourth lug 74 on the second long side 66 of the third portion 33. An arrangement the other way round is also possible, such that the third lug 73 is arranged on the second long side 66 and the fourth lug 74 on the first long side 65 of the third portion 33. It is also possible for the third lug 73 and the fourth lug 74 to be arranged jointly on the second long side 66 (on a side facing away from the second portion 32) of the third portion 33.

Figure 7:
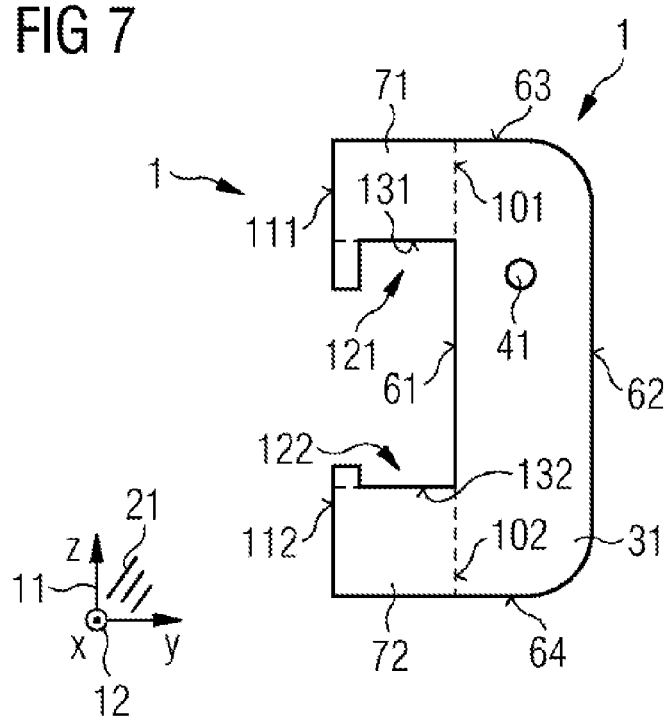
FIG. 7 shows a front view of a second embodiment of the securing element.

FIG. 7 shows a front view of a second embodiment of a securing element 1. Unless mentioned otherwise, the securing element 1 is configured in an identical manner to the securing element 1 described in FIGS. 1 to 6.

In this embodiment, the securing element 1 has only the first portion 31, while the second and third portions 32, 33 have been dispensed with. Furthermore, the securing element 1 of the second embodiment has only the first and the second lug 71, 72. Although not absolutely necessary, the first lug 71 and the second lug 72 each have the first and the second cutout 121, 122 in the illustration in FIG. 7.

As a result of the second and third portions 32, 33 being dispensed with, the first long side 61 is formed in an uninterrupted planar manner between the first lug 71 and the second lug 72. This configuration is particularly compact and is suitable in particular for securing components 141, 142 in a confined installation space situation.

Figure 8:
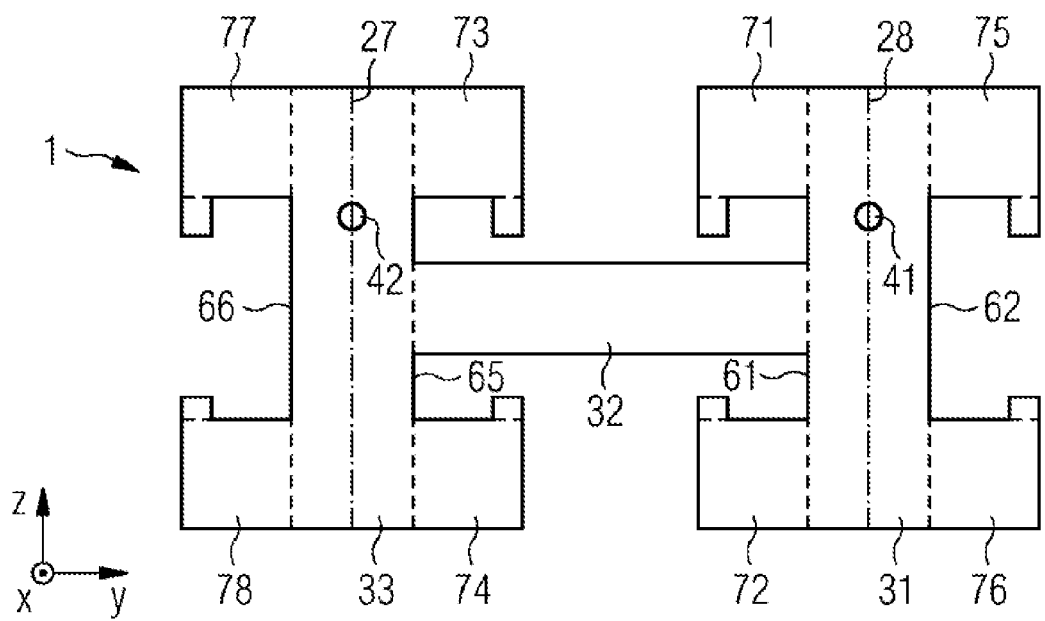
FIG. 8 shows a front view of a third embodiment of the securing element.

FIG. 8 shows a front view of a securing element 1 according to a third embodiment.

The third embodiment of the securing element 1 that is illustrated in FIG. 8 is, unless mentioned otherwise, configured in identical manner to the securing element 1 shown in FIGS. 1 to 6.

The securing element 1 has for example a total of eight lugs 71-78. In addition to the first to fourth lugs 71, 72, 73, 74, the securing element 1 has for example fifth to eighth lugs 75, 76, 77, 78. The number of lugs 71-78 is freely selectable, but should not be lower than explained in FIG. 7.

The first to fourth lugs 71, 72, 73, 74 are each configured and arranged as in the first embodiment of the securing element 1.

The seventh lug 77 is arranged opposite the third lug 73 in the y direction and in a mirror symmetric manner to the third lug 73 with respect to a second plane of symmetry 72, wherein the second plane of symmetry 27 is formed centrally between the first long side 65 and the second long side 66 of the third portion 33. The eighth lug 78 is arranged opposite the fourth lug 74 in the y direction and configured in a mirror symmetric manner to the fourth lug 74 with respect to the second plane of symmetry 27. In the z direction, the seventh and eighth lugs 77, 78 are arranged opposite one another jointly on the second long side 65 of the third portion 33.

The fifth lug 75 is arranged opposite the first lug 71 in the y direction and in a mirror symmetric manner to the first lug 71 with respect to a third plane of symmetry 28, wherein the third plane of symmetry 28 is formed centrally between the first long side 61 and the second long side 62 of the first portion 31. The sixth lug 76 is arranged opposite the second lug 72 in the y direction and configured in a mirror symmetric manner to the second lug 72 with respect to the third plane of symmetry 28. In the z direction, the fifth and sixth lugs 75, 76 are arranged opposite one another jointly on the second long side 62 of the first portion 31.

Figure 9:
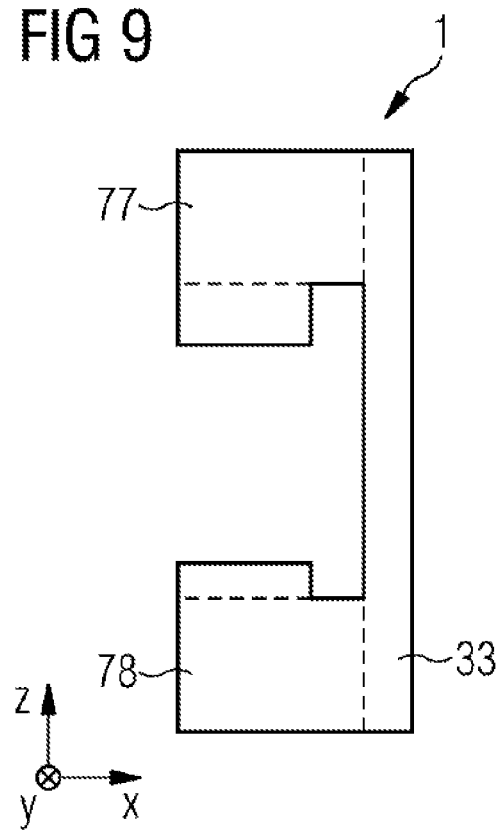
FIG. 9 shows a first side view of the third embodiment of the securing element.

FIG. 9 shows a first side view of the securing element 1 shown in FIG. 8.

All the lugs have the same extent in the x direction and in the y direction. For this reason, only the seventh and the eighth lugs 77, 78 can be seen in the illustration in FIG. 9, since they conceal all the other lugs. The seventh and the eighth lugs 77, 78 each have a cutout in the exemplary illustration in FIG. 9. This also goes for all the lugs that are concealed in FIG. 9, wherein all the cutouts can also be omitted.

Figure 10:
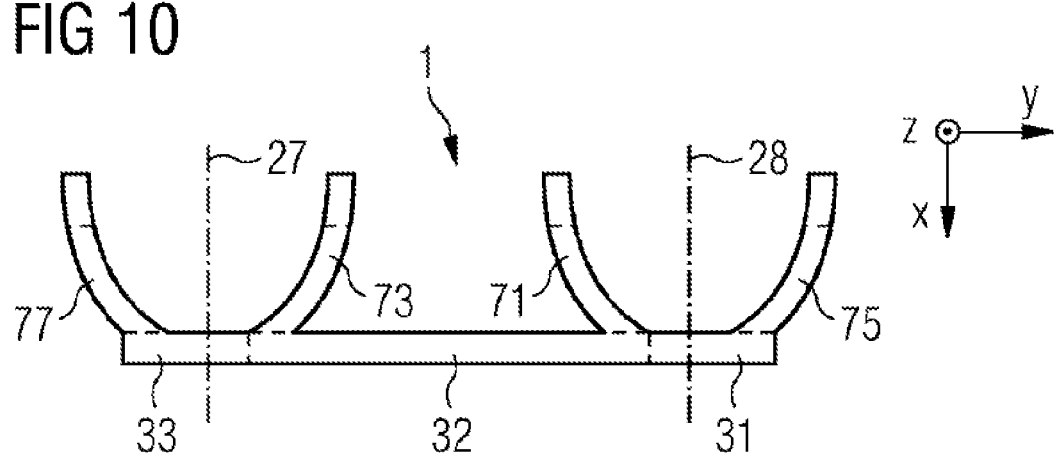
FIG. 10 shows a plan view of the third embodiment of the securing element.

FIG. 10 shows a plan view of the securing element 1 shown in FIGS. 8 and 9.

The fifth and seventh lugs 75, 77 likewise have lug regions and arc regions, wherein the lug regions extend along planes that extend preferably parallel to the second, third, fourth and fifth planes 22, 24. The arc regions can also be omitted. Also, the sixth and the eighth lug are configured in such a way, this not being apparent in FIG. 10 since the fifth lug 75 covers the sixth lug and the seventh lug 77 covers the eighth lug.

Although the invention has been described in detail and illustrated more specifically by the preferred exemplary embodiment, the invention is not limited by the disclosed examples and other variants can be derived therefrom by a person skilled in the art without departing from the scope of protection of the invention.

The invention claimed is:

1. A loss-prevention system, comprising:
   a first component, a second component, and at least a first releasable connection and a third releasable connection;
   at least one securing element being configured for securing said first and second components, said at least one securing element having a first portion, a first lug and a second lug, said first portion being configured as an elongate plate and extending in a first plane, said first portion having at least one first through-opening formed therein, said first through-opening being configured to at least partially receive said first releasable connection for fastening said at least one securing element to said first component, said first portion having a long side, said first lug and said second lug being disposed opposite one another on the long side of said first portion and projecting from the first plane onto a common side of the said first portion, said first lug being configured to rest on a top side of said first component, and said second lug being configured to support said second component on an underside of said second component and to secure said second component against falling off;
   said first releasable connection engaging through said first through-opening and fastening said at least one securing element to said first component;
   said third releasable connection being loaded in tension and connecting said first component to said second component;
   said first component and said second component being disposed at least partially between said first lug and said second lug;
   said second component, upon at least one of failure or releasing of said third releasable connection, resting on said second lug and said second lug securing said second component against falling down; and
   said first lug, upon at least one of failure or releasing of said first releasable connection, resting on said first component and retaining said at least one securing element on said first component.

2. The loss-prevention system according to claim 1, wherein:
   said first component has a first engagement portion;
   said first engagement portion is oriented parallel to said first portion;
   said first engagement portion engages in a first cutout;
   said first engagement portion has a first stop face disposed at a free end of said first engagement portion;
   said first stop face rests on a bottom of said first cutout upon at least one of failure or releasing of said third releasable connection.

3. The loss-prevention system according to claim 2, wherein:
   said second component has a second engagement portion;
   said second engagement portion is oriented parallel to said first portion and extends in an opposite direction to said first engagement portion;
   said second engagement portion engages in a second cutout;
   said second engagement portion has a second stop face disposed at a free end of said second engagement portion; and
   said second stop face rests on a bottom of said second cutout upon at least one of failure or releasing of said third releasable connection.

4. The loss-prevention system according to claim 1, wherein:
   said first lug has a first cutout;
   said first cutout is configured to at least partially receive said first component;
   said first lug has a first fixed end connected to said long side of said first portion;
   said first cutout is disposed on a side of said first lug facing said second lug and is open toward said second lug;
   the first cutout adjoins said first fixed end; and said first cutout is slot-shaped.

5. The loss-prevention system according to claim 4, wherein:
said second lug has a second cutout;
said second cutout is configured to at least partially receive said second component;
said second lug has a second fixed end connected to said long side of said first portion;
said second cutout adjoins said second fixed end;
said second cutout is slot-shaped; and
said second cutout is disposed on a side of said second lug facing said first lug and is open toward said first lug.

6. The loss-prevention system according to claim 1, wherein:
said first lug has a first lug region and a first arc region;
said second lug has a second lug region and a second arc region;
said first and second lug regions are planar;
said first lug region extends in a second plane and said second lug region extends in a third plane;
said second and the third planes are each disposed in a first direction parallel to said first portion and in a second direction perpendicularly at an angle to said first portion;
said first lug region adjoins a first free end of said first lug and said second lug region adjoins a second free end of said second lug; and
said first arc region connects said first lug region to said first portion and said second arc region connects said second lug region to said first portion.

7. The loss-prevention system according to claim 6, wherein said second plane and said third plane overlap, or said second plane is parallel to said third plane.

8. The loss-prevention system according to claim 6, wherein:
said at least one securing element has a second portion, a third portion, a third lug and a fourth lug;
said second portion and said third portion are each an elongate plate;
said second portion and said third portion extend in said first plane;
said third portion and said first portion are mutually offset;
said second portion is disposed perpendicularly at an angle relative to at least one of said first portion or said third portion;
said second portion is disposed between said first portion and said third portion and connects said first portion to said third portion;
said third portion is parallel to said first portion;
said third portion has a long side;
said third lug and said fourth lug are disposed opposite one another on said long side of said third portion and project from said first plane onto a common side of said third portion and onto an identical side as said first and second lugs;
said third lug is configured to rest on said top side of said first component; and
said fourth lug is configured to support said second component on an underside of said second component and to secure said second component against falling off.

9. The loss-prevention system according to claim 8, wherein:
said third lug has a third cutout or said fourth lug has a fourth cutout;
said third lug has a third fixed end and said the fourth lug has a fourth fixed end connected to said long side of said third portion;
said third cutout is configured to at least partially receive said first component or said fourth cutout is configured to at least partially receive said second component;
said third cutout adjoins said third fixed end of said third lug or said fourth cutout adjoins said fourth fixed end of said fourth lug;
said third cutout is disposed on a side of said third lug facing said fourth lug and is open toward said fourth lug or said fourth cutout is disposed on a side of said fourth lug facing said third lug and is open toward said third lug.

10. The loss-prevention system according to claim 8, wherein:
said third lug has a third cutout and said fourth lug has a fourth cutout;
said third lug has a third fixed end and said the fourth lug has a fourth fixed end connected to said long side of said third portion;
said third cutout is configured to at least partially receive said first component and said fourth cutout is configured to at least partially receive said second component;
said third cutout adjoins said third fixed end of said third lug and said fourth cutout adjoins said fourth fixed end of said fourth lug;
said third cutout is disposed on a side of said third lug facing said fourth lug and is open toward said fourth lug and said fourth cutout is disposed on a side of said fourth lug facing said third lug and is open toward said third lug.

11. The loss-prevention system according to claim 8, wherein:
said third lug extends at least partially in a fourth plane and said fourth lug extends at least partially in a fifth plane; and
at least one of:
said second plane and said fourth plane are parallel to one another, or
said third plane and said fifth plane are parallel to one another.

12. The loss-prevention system according to claim 8, wherein at least one of said third lug or said fourth lug being disposed on a side of said third portion facing said first portion, and at least one of said first lug or said second lug being disposed on a side of said first portion facing said third portion.

13. The loss-prevention system according to claim 8, wherein at least one of said third lug or said fourth lug being disposed on a side of said third portion facing away from said first portion, and at least one of said first lug or said second lug being disposed on a side of said first portion facing away from said third portion.

14. The loss-prevention system according to claim 6, which further comprises:
a second releasable connection;
said third portion having at least one second through-opening;
said at least one second through-opening being configured to at least partially receive said second releasable connection for fastening said at least one securing element to said first component.

15. The loss-prevention system according to claim 1, wherein said at least one securing element is part of a rail vehicle.

* * * * *